(12) United States Patent
Dulloor et al.

(10) Patent No.: US 9,423,959 B2
(45) Date of Patent: Aug. 23, 2016

(54) METHOD AND APPARATUS FOR STORE DURABILITY AND ORDERING IN A PERSISTENT MEMORY ARCHITECTURE

(71) Applicant: Intel Corporation, Santa Clara, CA (US)

(72) Inventors: Subramanya R. Dulloor, Hillsboro, OR (US); Sanjay Kumar, Hillsborl, OR (US); Rajesh M. Sankaran, Portland, OR (US); Gilbert Neiger, Hillsboro, OR (US); Richard A. Uhlig, Hillsboro, OR (US); Robert S. Chappell, Portland, OR (US); Joseph Nuzman, Haifa (IL); Kai Cheng, Portland, OR (US); Sailesh Kottapalli, San Jose, CA (US); Yen-Cheng Liu, Portland, OR (US); Mohan Kumar, Aloha, OR (US); Raj K. Ramanujan, Federal Way, WA (US); Glenn J. Hinton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 13/931,875

(22) Filed: Jun. 29, 2013

(65) Prior Publication Data

US 2015/0006834 A1  Jan. 1, 2015

(51) Int. Cl.
*G06F 12/00* (2006.01)
*G06F 3/06* (2006.01)
*G06F 13/16* (2006.01)

(52) U.S. Cl.
CPC ............ *G06F 3/0604* (2013.01); *G06F 3/0659* (2013.01); *G06F 3/0671* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 5,887,134 A * | 3/1999 | Ebrahim | 709/200 |
| 2009/0049334 A1 * | 2/2009 | Elliott | G06F 3/0619 714/5.11 |
| 2014/0365734 A1 * | 12/2014 | Bridge et al. | 711/144 |

* cited by examiner

*Primary Examiner* — Baboucarr Faal
(74) *Attorney, Agent, or Firm* — Nicholson De Vos Webster & Elliott, LLP

(57) ABSTRACT

An apparatus and method are described for store durability and ordering in a persistent memory architecture. For example, one embodiment of a method comprises: performing at least one store operation to one or more addresses identifying at least one persistent memory device, the store operations causing one or more memory controllers to store data in the at least one persistent memory device; sending a request message to the one or more memory controllers instructing the memory controllers to confirm that the store operations are successfully committed to the at least one persistent memory device; ensuring at the one or more memory controllers that at least all pending store operations received at the time of the request message will be committed to the persistent memory device; and sending a response message from the one or more memory controllers indicating that the store operations are successfully committed to the persistent memory device.

18 Claims, 9 Drawing Sheets

_US 9,423,959 B2_

METHOD AND APPARATUS FOR STORE DURABILITY AND ORDERING IN A PERSISTENT MEMORY ARCHITECTURE

BACKGROUND

1. Field of the Invention

This invention relates generally to the field of computer processors. More particularly, the invention relates to an apparatus and method for store durability and ordering in a persistent memory architecture.

2. Description of the Related Art

Big data analytics and cloud computing are necessitating the need for applications to process large amounts of data to service a growing number of users expecting real-time responses. Evidence of these trends is common at most vendors operating Internet data centers such as Google, Facebook, Amazon, Microsoft, etc. However, capacity limitations of memory (e.g., DRAM) and large random accesses overheads/latencies for storage (HDD, SSD) impose significant challenges to meet these new application requirements. Emerging "persistent memory" technologies such as Phase Change Memory offer desirable capabilities that can help address these application challenges. For example:

Higher capacities compared to DRAM, with same order of magnitude performance; and Byte-addressability (as opposed to page/block addressability of Flash memory), allowing them to be attached to processor memory bus.

With such persistent-memory architecture, system software (e.g., the operating system) and applications can access nonvolatile storage using regular load/store instructions, without incurring the overheads of traditional storage stacks (file systems, block storage, I/O stack, etc.). However, stores to persistent memory impose new challenges for software to enforce and reason about the "persistence" of stores, which was not relevant until now with volatile main memory. Specifically, there are a number of intermediate volatile buffers between the processor core and persistent memory (such as WB buffers, caches, fill-buffers, uncore/interconnect queues, memory controller write pending buffers, etc.), and a store operation is not truly persistent until the store data has reached some power-fail safe point at the persistent memory controller.

Existing processor ISAs and memory ordering allows software to enforce or reason about store visibility only at following levels:

Local visibility: Stores retired by a thread are visible to itself. This happens immediately.

Global visibility: Stores retired by a thread are visible to all cores in the system. This is enforced through the cache coherency states for WB stores and through memory/store FENCE instructions for special (WC, non-temporal) stores.

Non-Coherency visibility: Stores retired by a thread are visible to non-coherent domain (such as I/O). This is enforced by the use of CLFLUSH+FENCE instructions.

In other words, software can only ensure that a set of stores are visible at the global ordering point (typically at the memory controller). At this point, we say that these stores are "accepted to memory." However, in a system with persistent memory, software also needs the ability to guarantee and reason persistence and ordering of stores to persistent memory (e.g., database log updates, data or metadata updates in file-systems, etc.). This may be referred to as "persistence visibility" where stores retired by a thread have reached power-fail protected domain (i.e., have become durable) which could be the persistent device itself or some adjacent power-fail safe buffer that has enough residual energy to write to persistent device even in case of a power failure.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
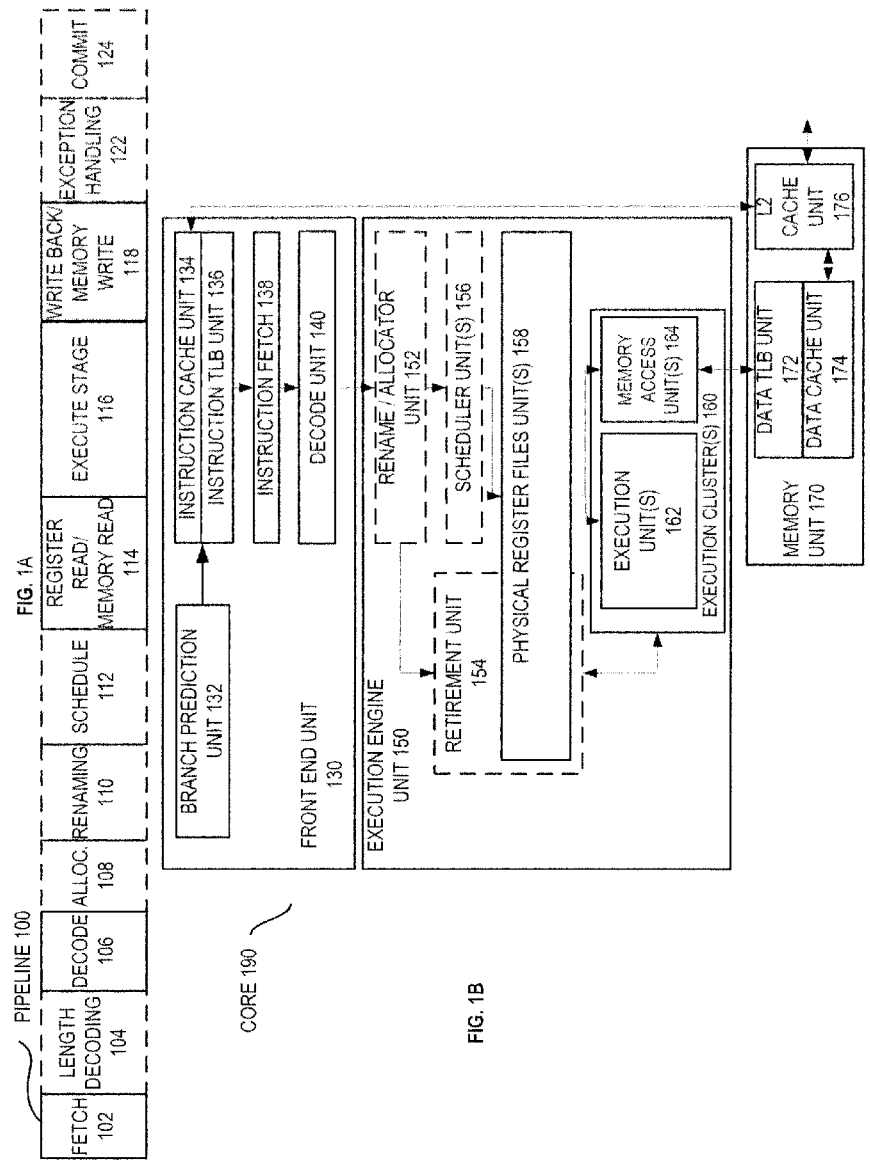
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 performs the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
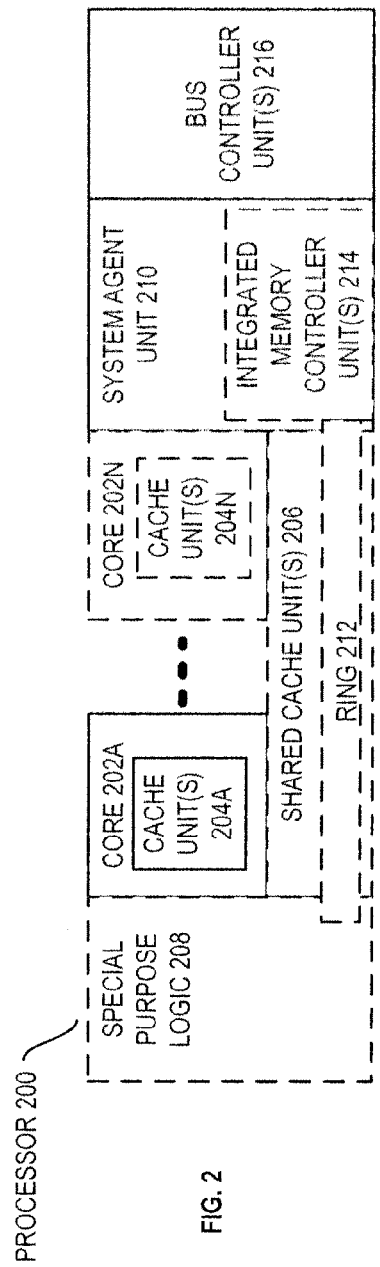
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
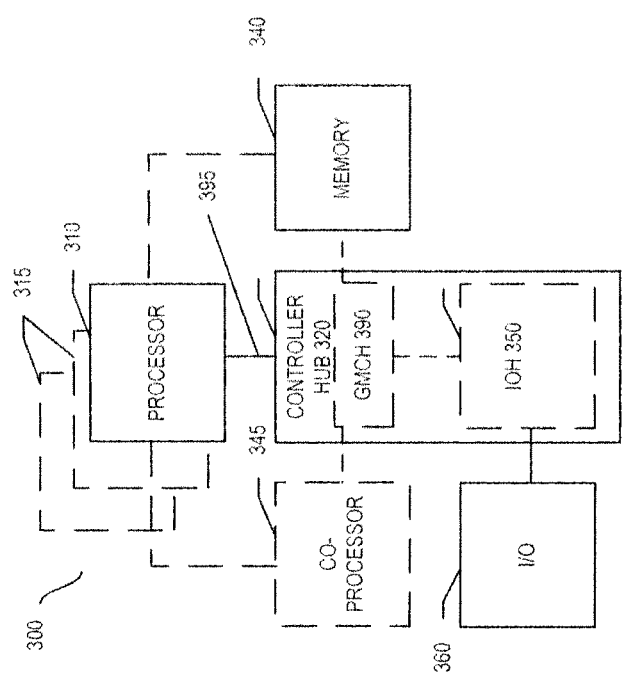
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
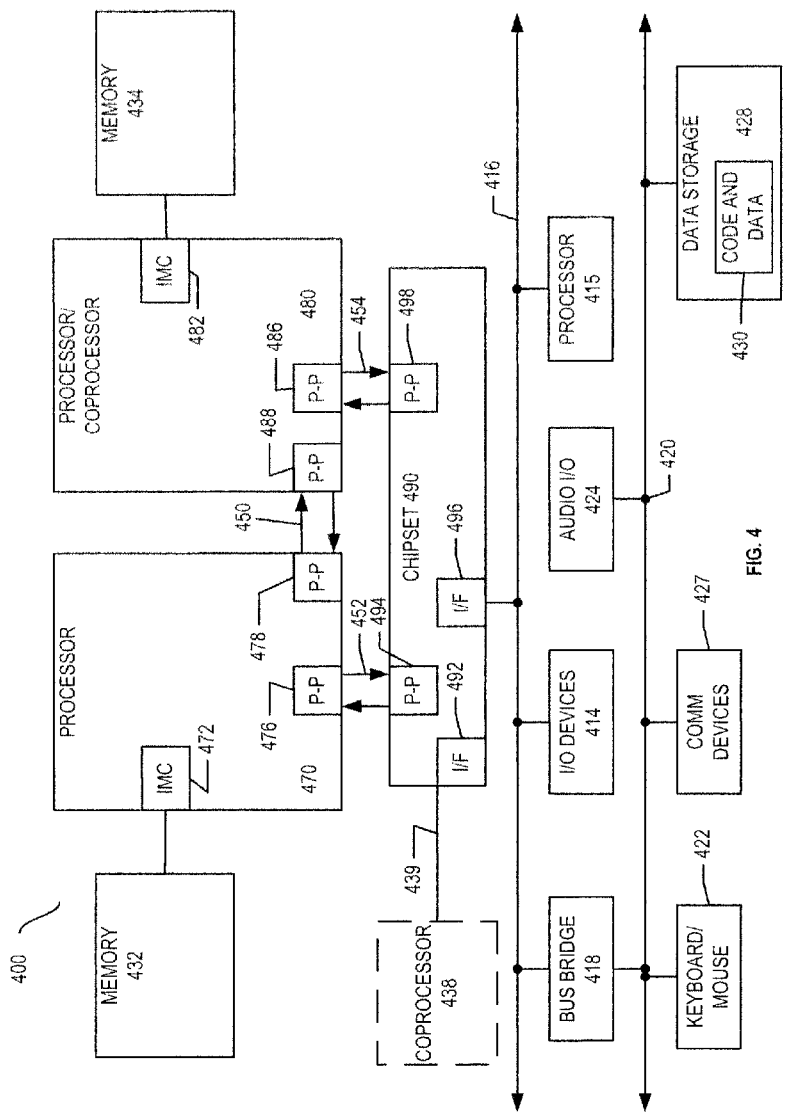
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
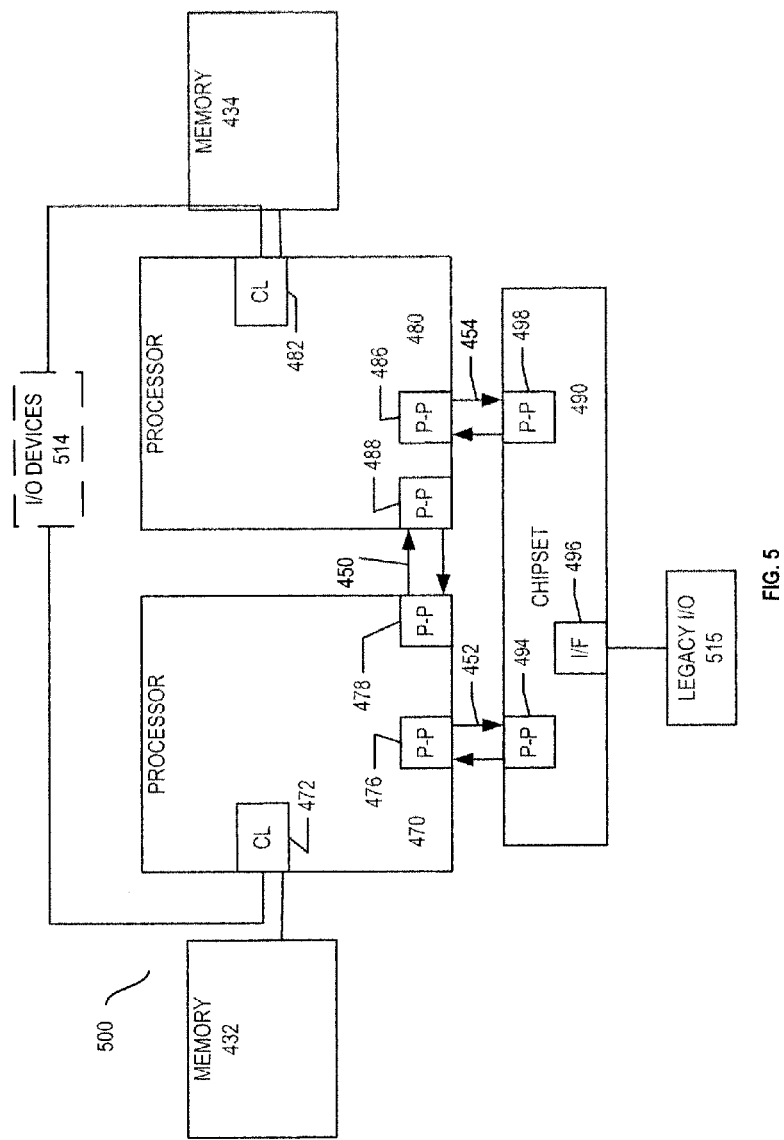
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
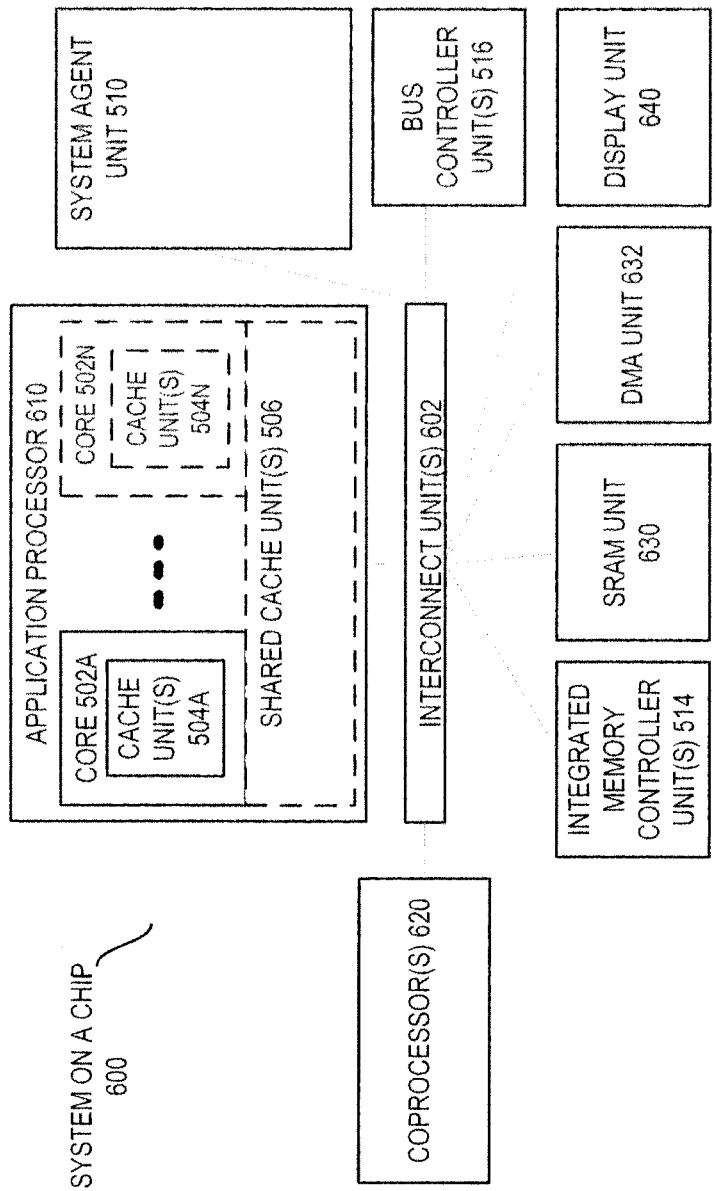
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
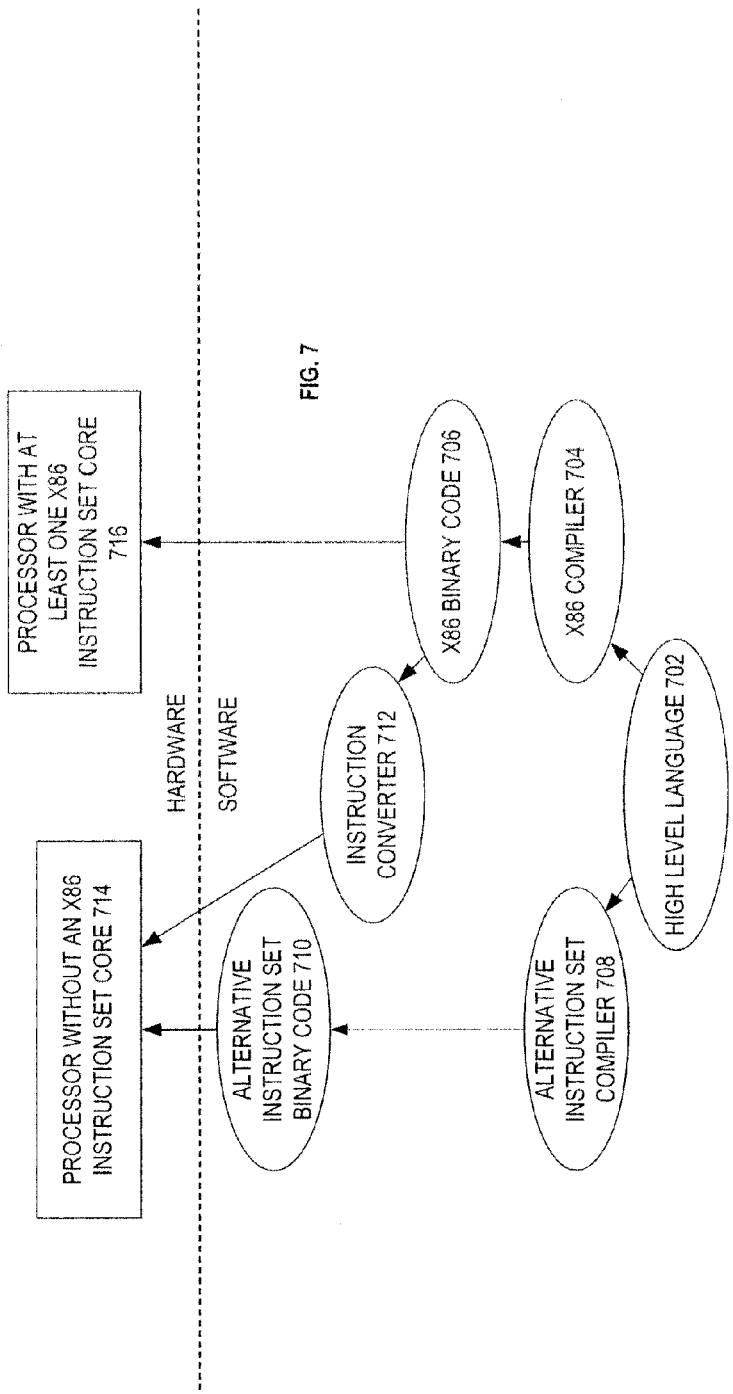
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Store Durability and Ordering in a Persistent Memory Architecture The embodiments of the invention provide an instruction set architecture (ISA) extension and a method/apparatus for software to enforce and order store durability in a multi-core/multi-processor platform. Without this support, software (applications, operating system, virtual machine monitor, etc.) cannot guarantee whether stores have become durable, and in what order.

While persistent memory technologies (such as Phase Change Memory) that offer large capacities and byte addressability are only emerging, there are existing solutions that emulate persistent memory using volatile memory (DRAM) or listing block storage memory (NAND). Two such examples are:

Battery-backed DRAM: Some existing platforms (such as storage appliances) use battery-powered DRAM as persistent memory to improve storage performance (E.g., RAID write cache). These platforms use special circuitry to detect power-failures, and flush the write-pending buffers in the memory controllers before placing the DRAM devices in self-refresh (ADR—Asynchronous DRAM Refresh) mode powered by battery source. In these platforms, there is no guaranteed way for software to detect which pending in flight stores made it into memory versus were lost, and it is the responsibility of software to detect any torn (partial) writes at a higher-level and recover from them.

NVDIMM: NVDIMM is another existing solution that combines standard volatile DRAM device and non-volatile storage (NAND) on the same DIMM device, along with an ultra-capacitor as a residual power source. On a platform power failure, the residual energy of the platform power-units are used to flush the memory-controller write-pending buffers to DRAM on the DIMM, and use the residual energy offered by the ultra-capacitors to copy all of DRAM contents to the non-volatile (NAND) device. When the power is restored, the NVDIMM restores the contents from NAND back to DRAM, before software can consume it.

In these solutions, the platform provides a best effort "flush-on-fail" solution to push as much in-flight/pending stores as possible to the persistent domain, but does not offer any programmatic way for software to enforce/order store durability like the "flush" primitives on a storage stack/device. In contrast, the embodiments of the invention described herein offer a "flush-on-request" primitive for software to enforce store persistence and manage relative ordering of other loads and stores. These embodiments combine to provide the first platform-level solution that guarantees software-visible persistence and ordering or stores.

Figure 8:
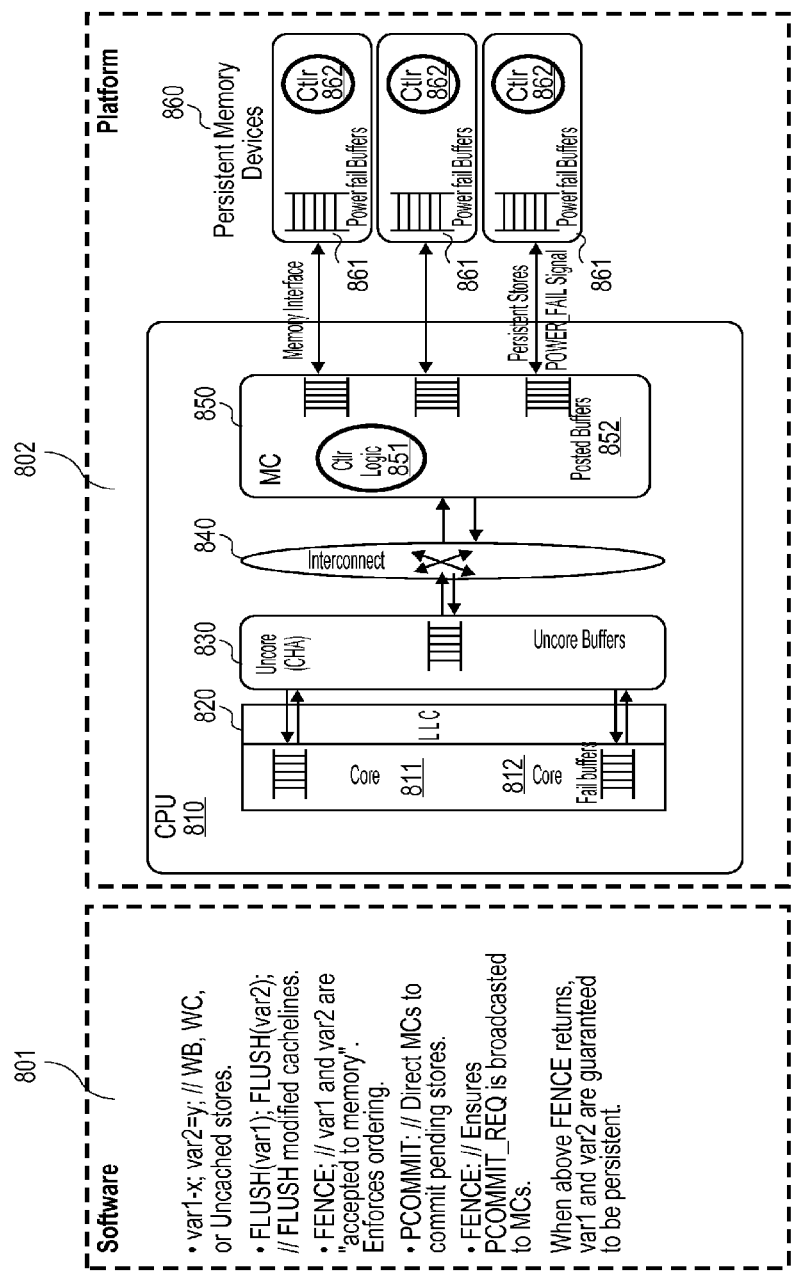
FIG. 8 illustrates a system architecture in accordance with one embodiment of the invention.

As illustrated in FIG. 8, one embodiment of the invention includes a processor 810 having one or more processor cores 811-812 with support for a new "Persistent Commit" (PCOMMIT) instruction that ensures that all store data "accepted to memory" reaches persistent memory device 860. On execution of the PCOMMIT instruction, the cores 811-812 may issue a PCOMMIT request (REQ) message to all the memory controllers 850 with persistent memory in the platform. The broadcast of the PCOMMIT REQ may be generated directly by the cores 811-812 (e.g., using microcode assist) or may be generated by uncore logic 830 (e.g., an agent) on behalf of core request.

The illustrated embodiment includes a memory controller (MC) 850 with control logic 851 capable of distinguishing between volatile and persistent memory requests. It may do so, for example, based on the target address in the requests (e.g., with persistent memory allocated to specific address ranges) or through other attributes conveyed over the interconnect 840 from the core/uncore. In one embodiment, on receiving a PCOMMIT REQ message, the MC 850 ensures that all pending stores to persistent memory that are already "accepted" by the MC 850 are pushed to the persistent domain (power-fail safe point) before returning a PCOMMIT response (RESP) message.

The illustrated embodiment also includes one or more persistent memory devices 860, or suitable field replaceable unit that hosts the non-volatile media. In one embodiment, the persistent memory devices 860 comprise phase change memory (PCM) such as phase change memory and switch (PCMS). However, the underlying principles of the invention are not limited to any particular type of persistent memory. The persistent memory devices 860 may also support power-fail safe volatile (e.g., SRAM) buffers 861 (for improving write performance) that can be flushed to persistent media upon receiving POWER FAIL control messages. Thus, in one embodiment, the illustrated platform 802 is capable of sending a POWER FAIL signal to the persistent memory devices 860.

The illustrated embodiment also includes software 801 (e.g., applications, operating systems, virtual memory managers, etc), capable of using the new instructions such as PCOMMIT as well as existing memory ordering instructions (e.g., such as FENCE instructions) to enforce push-on-request persistence and managing relative ordering of other loads and stores.

The embodiments described herein provide the ability for the software to explicitly force persistence of store data that is "accepted to memory" using PCOMMIT instruction (mentioned above). In one embodiment, PCOMMIT instruction may be weakly ordered to optimally convey commit operation to MCs. In this embodiment, the ordering of memory load/store operations with PCOMMIT operations may be controlled through existing FENCE instructions. In addition, the illustrated embodiment provides performance optimizations for writes at persistent memory devices 860 through use of power-fail safe write buffers 861, and the ability to use flush-on-fail capabilities of the platform 802 to flush the writes to persistent media.

Figure 9:
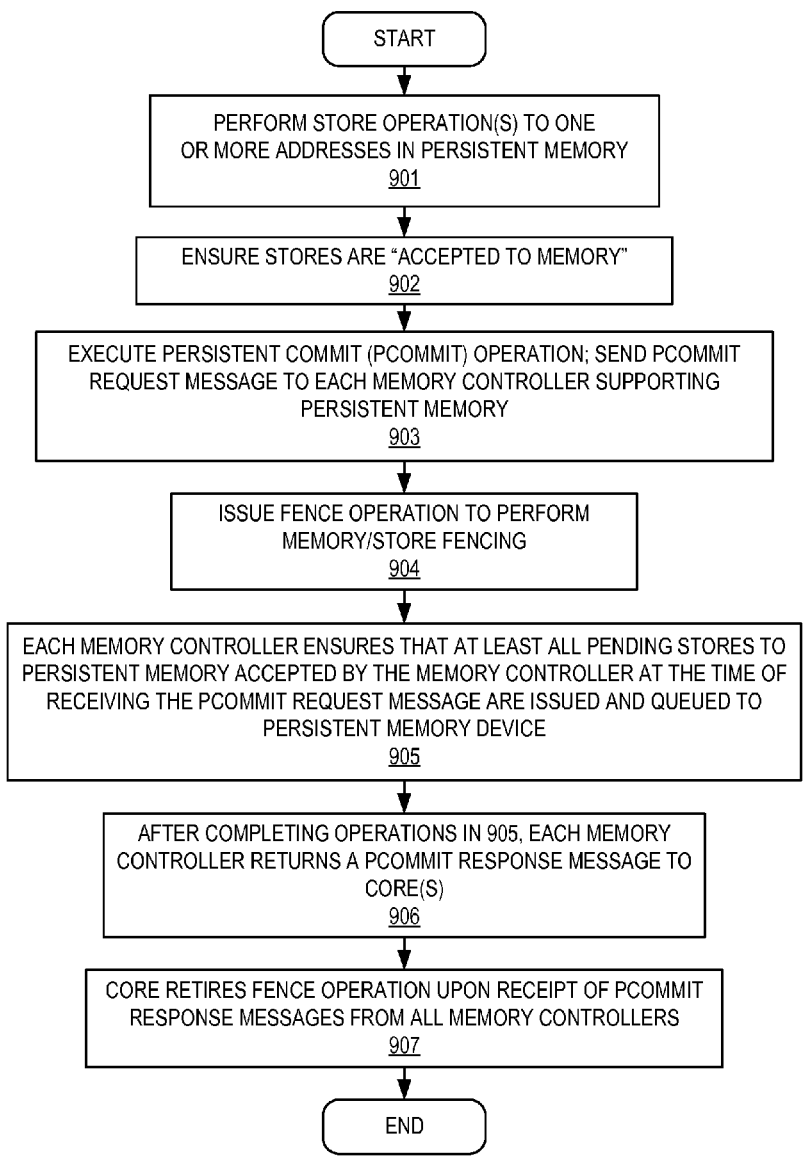
FIG. 9 illustrates a method in accordance with one embodiment of the invention.

A method in accordance with one embodiment of the invention is illustrated in FIG. 9. The method may be implemented within the context of the architecture shown in FIG. 8, but is not limited to any specific processor or platform architecture.

At 901, software performs a normal write-back (WB) stores to one or more addresses in persistent memory. At 902, software ensures that the store operations are "accepted to memory" by executing FLUSH operations (which are weakly ordered for best batching performance) on appropriate cacheline addresses, followed by a FENCE operation to ensure ordering. At the retirement of the FENCE operation, stores are guaranteed to be at least at the global ordering point (e.g., the memory controller write buffers 861), but are not guaranteed to be persistent.

At 903, a the software executes a PCOMMIT instruction on one of the cores 811-812. On executing the PCOMMIT instruction, the processor core initiates a PCOMMIT REQ message to each MC 850 hosting persistent memory in the system. To facilitate this, in one embodiment, a complete list of MCs supporting persistent memory is configured as part of the platform initialization process (e.g., by the initialization firmware).

In one embodiment, the broadcast of PCOMMIT REQ to the target MCs may be performed directly by the processor core or microcode. In another embodiment, the broadcast and collection of responses for these requests may be offloaded from the processor core to uncore/glue logic 830. In an uncore implementation additional opportunities are provided to coalesce multiple in-flight PCOMMIT requests from multiple cores to the same MC, thus reducing overhead.

At 904, the software issues a FENCE operation that performs memory/store fencing. The fencing operation of this embodiment has at least two effects: (a) it ensures that the weakly-ordered PCOMMIT instruction has retired and the PCOMMIT REQ messages were indeed issued out of the processor core; and (b) it guarantees that the core has received a PCOMMIT RESP (completion) for each of the PCOMMIT REQ messages issued to the various MCs, which confirms that the stores have becomes persistent.

At 905, on receiving a PCOMMIT REQ message at a MC, the respective MC ensures a PCOMMIT RESP message is returned back only after at least all pending stores to persistent memory already accepted by the MC at the time of accepting the PCOMMIT REQ are issued and queued to the persistent memory device without any errors. The MC may accomplish this in multiple ways. In one embodiment, the MC accomplishes this by using the PCOMMIT REQ message as a marker to identify the pending stores to persistent memory in its write pending buffer that are older. In this scheme, as the older requests gets dispatched to the persistent memory device, the PCOMMIT REQ eventually reaches the head of the queue at which point a PCOMMIT RESP is returned by the MC. In another embodiment, on accepting a PCOMMIT REQ, the MC takes a snapshot of the write pending queue and returns a PCOMMIT RESP only after all stores to persistent memory in the snapshot are dispatched and queued to the persistent memory device without errors.

At 906, each MC returns a PCOMMIT RESP message once the persistent memory devices have accepted the writes and the store data is guaranteed to be in power fail protected domain. The signaling between MC and persistent memory ensures that the stored data has reached the persistent memory device without any ECC errors. In case of partial writes, the read-modify-write operation used to process each partial write is guaranteed to have completed to the persistent memory device without errors. In one embodiment, the persistent memory device includes intermediate power-fail safe write buffers, which have guaranteed residual energy to push the pending writes to the persistent media in case of a power fail indication from the platform. The residual energy budget needs to carefully factor in any transient error conditions at the persistent media that requires retries and any wear-leveling overheads that may be incurred on writes to persistent media. Power-fail protected write buffers in persistent memory devices are optional and used only to improve write bandwidth.

At 907, the core retires the FENCE instruction when it receives the PCOMMIT RESP for all the PCOMMIT REQ messages to the various MCs, and the resumes normal program execution. From the software perspective, stores are guaranteed to be persistent when the FENCE operation completes. Depending on the FENCE operation used, software is also guaranteed subsequent memory/store operations following the FENCE instruction in program order are executed only after the FENCE retires.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising: performing at least one store operation to cause one or more memory controllers to store data in at least one persistent memory device;
    sending a request message to the one or more memory controllers instructing the one or more memory controllers to confirm that the at least one store operation is successfully committed to a power-fail safe volatile buffer of the at least one persistent memory device without an error;
    sending a power fail control message to cause the power-fail safe volatile buffer to store the data in the at least one persistent memory device;
    sending a response message from the one or more memory controllers indicating that the at least one store operation is successfully committed to the power-fail safe volatile buffer of the at least one persistent memory device without the error;
    providing a residual energy budget for the power-fail safe volatile buffer that includes a retry of the store of the data in the at least one persistent memory device because of the error condition; and
    retrying the store of the data in the at least one persistent memory device because of the error condition without exceeding the residual energy budget.

2. The method of claim 1, further comprising:
    executing a persistent commit instruction to cause the request message to be sent to the one or more memory controllers, the persistent commit instruction being retired only after receiving the response message.

3. The method of claim 2, wherein the persistent commit instruction is a weakly ordered persistent commit instruction, the method further comprising:
    issuing a fence operation to perform a fence operation associated with issuance of the persistent commit instruction.

4. The method of claim 3, wherein the fence operation ensures that the weakly ordered persistent commit instruction is retired and the request message is issued to the one or more memory controllers.

5. The method of claim 4, wherein the fence operation further guarantees that a response message has been received for each request message issued to the one or more memory controllers to confirm that the at least one store operation has become persistent.

6. The method of claim 1, wherein the sending the request message further comprises using the request message as a marker to identify pending stores to the power-fail safe volatile buffer of the at least one persistent memory device that are older.

7. The method of claim 6, wherein as older pending stores are dispatched to the power-fail safe volatile buffer of the at least one the persistent memory device, the request message reaches a head of a queue and the memory controller responsively issues the response message.

8. The method of claim 1, wherein the sending the response message further comprises taking a snapshot of a write pending queue and returning the response message only after all stores to the power-fail safe volatile buffer of the at least one persistent memory device in the snapshot are dispatched and queued without error.

9. The method claim 1, further comprising providing a residual energy budget for the power-fan safe volatile buffer that includes a wear-leveling overhead for the store of the data in the at least one persistent memory device, and performing a wear-leveling operation for the store of the data in the at least one persistent memory device without exceeding the residual energy budget.

10. An apparatus comprising:
    at least one persistent memory device with a power-fail safe volatile buffer; and
    one or more memory controllers to confirm that at least one store operation of data is successfully committed to the power-fail safe volatile buffer of the at least one persistent memory device without an error in response to receipt of a request message and to send a response message to indicate that the at least one store operation successfully committed to the power-fail safe volatile buffer of the at least one persistent memory device without the error, wherein the memory controller is to cause the power-fail safe volatile buffer to store the data in the at least one persistent memory device on receipt of a power fail control message, the power-fail safe volatile buffer comprises a residual energy budget that includes a retry of the store of the data in the at least one persistent memory device because of an error condition and the power-fail safe volatile buffer is to retry the store of the data in the at least one persistent memory device because of the error condition without exceeding the residual energy budget.

11. The apparatus of claim 10, further comprising:
a processor to execute a persistent commit instruction to cause the request message to be sent to the one or more memory controllers, wherein the persistent commit instruction is to be retired only after receipt of the response message.

12. The apparatus of claim 11, wherein the persistent commit instruction is a weakly ordered persistent commit instruction and the processor is to perform a fence operation associated with the persistent commit instruction.

13. The apparatus of claim 12, wherein the fence operation of the processor is to ensure that the weakly ordered persistent commit instruction is retired and the request message is issued to the one or more memory controllers.

14. The apparatus of claim 13, wherein the fence operation of the processor is to further guarantee that a response message has been received for each request message issued to the one or more memory controllers to confirm that the at least one store operation has become persistent.

15. The apparatus of claim 10, wherein the memory controller is to use the request message as a marker to identify pending stores to the power-fail safe volatile buffer of the at least one persistent memory device that are older.

16. The apparatus of claim 15, wherein as older pending stores are dispatched to the power-fail safe volatile buffer of the at least one the persistent memory device, the request message is to reach a head of a queue and the memory controller is to responsively issue the response message.

17. The apparatus of claim 10, wherein the memory controller is to take a snapshot of a write pending queue and return the response message only after all stores to the power-fail safe volatile buffer of the at least one persistent memory device in the snapshot are dispatched and queued without error.

18. The apparatus of claim 10, wherein the power-fail safe volatile buffer comprises a residual energy budget that includes a wear-leveling overhead for the store of the data in the at least one persistent memory device, and the power-fail safe volatile buffer is to perform a wear-leveling operation for the store of the data in the at least one persistent memory device without exceeding the residual energy budget.

* * * * *